US008840445B2

(12) United States Patent
Takahashi

(10) Patent No.: US 8,840,445 B2
(45) Date of Patent: Sep. 23, 2014

(54) BUMPER PAINT REMOVING APPARATUS

(75) Inventor: Noboru Takahashi, Tokyo (JP)

(73) Assignee: Takaroku Shoji., Ltd., Tokyo (JP)

( * ) Notice: Subject to any disclaimer, the term of this patent is extended or adjusted under 35 U.S.C. 154(b) by 88 days.

(21) Appl. No.: 13/638,383

(22) PCT Filed: Dec. 3, 2010

(86) PCT No.: PCT/JP2010/071673
§ 371 (c)(1), (2), (4) Date: Jan. 9, 2013

(87) PCT Pub. No.: WO2011/132342
PCT Pub. Date: Oct. 27, 2011

(65) Prior Publication Data
US 2013/0109281 A1    May 2, 2013

(30) Foreign Application Priority Data
Apr. 20, 2010 (JP) ................. 2010-097070

(51) Int. Cl.
*B24C 3/08* (2006.01)
*B24C 3/12* (2006.01)
*B29B 17/00* (2006.01)
*B29B 17/02* (2006.01)
*B29L 9/00* (2006.01)
*B29B 17/04* (2006.01)
*B29L 31/30* (2006.01)

(52) U.S. Cl.
CPC ............ *B29B 17/00* (2013.01); *B29L 2009/005* (2013.01); *B29B 2017/0432* (2013.01); *B29B 2017/044* (2013.01); *B29L 2031/3044* (2013.01); *B29B 17/02* (2013.01)
USPC .................. 451/70; 451/80; 451/38

(58) Field of Classification Search
CPC ............ B24C 3/12; B24C 9/00; B24C 1/086; B24C 3/08; B24C 3/10; B24C 3/085; B24C 3/00; B24C 3/266; B24C 9/003; B29B 17/00; B29B 2017/0432; B29B 17/0448
USPC .................. 451/80, 81, 83, 70, 75, 38, 39, 40
See application file for complete search history.

(56) References Cited

U.S. PATENT DOCUMENTS 2,952,100 A * 9/1960 Pelley .............................. 451/80
3,934,379 A * 1/1976 Braton et al. ................... 451/38

(Continued)

FOREIGN PATENT DOCUMENTS

JP    07-256642 A    10/1995
JP    08-244034 A    9/1996

(Continued)

OTHER PUBLICATIONS

International Search Report for PCT/JP2010/071673 mailed Dec. 3, 2010.

*Primary Examiner* — Robert Rose
(74) *Attorney, Agent, or Firm* — Arent Fox LLP

(57) ABSTRACT

In order to be able to easily and sufficiently remove paint from the surface of a bumper, grooves or projections are provided on the surface of one roller, from among a pair of rollers on a roller apparatus (1), that comes into contact with the surface of the paint, and the paint is divided by making cuts in the paint by means of the grooves, or the like. In addition, by making the rotation speed of one roller faster than the other roller, the abovementioned cuts are widened further and the paint is divided into a plurality of narrow, strip-shaped pieces. When a sandblasting apparatus (2) sandblasts towards the strips of paint, and the like, from a diagonal direction, the sandblast strikes not only the surface of the paint but the edges of the cuts as well, whereby the paint can be efficiently removed.

8 Claims, 12 Drawing Sheets

(56) References Cited

U.S. PATENT DOCUMENTS

| | | | |
|---|---|---|---|
| 4,731,125 A * | 3/1988 | Carr | 134/7 |
| 4,793,103 A * | 12/1988 | Baumgart | 451/81 |
| 5,044,129 A * | 9/1991 | Olevitch | 451/53 |
| 5,094,696 A * | 3/1992 | Orsen | 134/38 |
| 6,076,584 A * | 6/2000 | Yamamoto et al. | 156/760 |
| 6,296,035 B1 * | 10/2001 | Yamamoto et al. | 156/750 |

FOREIGN PATENT DOCUMENTS

| | | |
|---|---|---|
| JP | 09-099434 A | 4/1997 |
| JP | 09-254034 A | 9/1997 |
| JP | 2002-018716 A | 2/2002 |
| JP | 2002-301424 A | 10/2002 |

\* cited by examiner

BUMPER PAINT REMOVING APPARATUS

CROSS-REFERENCED TO RELATED APPLICATION

This application is a National Stage entry of International Application PCT/JP2010/071673, filed Dec. 3, 2010, which claims priority to Japanese Patent Application No. 2010-097070 filed Apr. 20, 2010, the disclosure of the prior applications are hereby incorporated in their entirety by reference.

TECHNICAL FIELD

The present invention relates to a device for removing paint from a bumper of a vehicle made of synthetic resin such as passenger cars, and particularly to a device for removing paint from a bumper in which paint is parted using rollers and is then removed through shot blasting and other methods.

BACKGROUND ART

Demands for enhancing the sense of resource reusing in view of environmental problems are increasing in the industrial world, and movements of recycling resin products have become active. Particularly, it is the case with bumpers of vehicles made of thermoplastic synthetic resin such as polypropylene group resin that a large quantity of defective products that have been deemed to be inappropriate during manufacturing processes and bumpers that have been collected from scrapped cars is brought about, and there are demands for reusing such products.

By the way, the surface of synthetic resin that comprises a bumper of a vehicle is treated with thermosetting resin paint such as polyester urethane. Such a bumper not only exhibits superior heat resistivity or the like but also have a nice appearance with a glossy surface.

However, when products undergo recycling processes with some parts of such paint remaining, paint pieces will be mixed into synthetic resin to hinder its fluidity which might cause reasons of imperfect moldings. Since such paint pieces will come up to the surface, they will spoil the appearance of the bumper even if they are repeatedly painted. Accordingly, a bumper cannot be reused with any paint remaining on the surface of the bumper.

There are accordingly known various methods and devices for removing paint so that they doe not remain on the surface of a bumper. For instance, in the shot blast method, paint is removed through impact of jetted shot or the like. In a method of using a chemical solution such as an ethanol-water mixture, paint is removed by dissolving the same by immersion using this solution.

There is suggested a method for removing paint by generating shear stress between the paint and the resin material by rolling the bumper upon setting a peripheral velocity of a paint side roller to be larger than a peripheral velocity of a non-paint side roller (see Patent Literature 1). More particularly, since the non-paint side roller which rotation is slow will function as a brake that prevents progress of the bumper, the paint is pulled to in a rotating direction through frictional force between this roller and the paint side roller which rotation is fast such that the paint is stripped off from the surface of the resin material.

CITATION LIST

Patent Literature

[Patent Literature 1] U.S. Pat. No. 3,177,371

SUMMARY OF THE INVENTION

Subject the Invention is to Solve

However, the above-mentioned conventional methods and devices for removing paint of a bumper include the following subjects that need to be improved. More particularly, since the paint is applied to the entire surface of a bumper having a three-dimensional shape, it is not easily to remove all of the paint without omission by merely jetting shot blast thereto. Further, since chemical solutions include toxic substances, treatments of used solutions are difficult.

Further, it is deemed that paint can not always be removed using the method or the like as recited in Patent Literature 1. More particularly, it is not easily to strip off the thin paint that is widely applied on the surface of the bumper so as to shift the same in the rotating direction with respect to the synthetic resin through merely the frictional force that is generated between the bumper and the paint side roller or the like which outer peripheral surface is, for instance, mirror finished. Further, even if the three-dimensionally shaped bumper is rolled by the rollers into a flat shape, the surface will not become completely flat but concaves and convexes will remain. Accordingly, the outer peripheral surface of the paint side roller having a mirror finished surface or the like will not contact portions that are concaved so that paint at such portions cannot be stripped off.

It is accordingly an object of the present invention to provide a device for removing paint from a bumper of a vehicle capable of easily and sufficiently removing paint from a surface of a bumper.

Means for Solving the Subject

For solving the above subject, the device for removing paint from a bumper according to the present invention is characterized by the feature that removal of paint through shot blasting is made easy by rolling a bumper while nicks are formed in the paint. More particularly, the device for removing paint from a bumper according to the present invention comprises a pair of rollers for rolling a bumper of a vehicle made of synthetic resin and a shot blast device for removing paint remaining on the surface of the bumper that is transferred out from the rollers. The pair of rollers is rotated into mutually opposing directions and one of the pair of rollers has a rotational speed that is faster than that of the other roller, and the surface of the one roller is formed with grooves or projections. Due to the grooves or projections formed on the surface of the one roller, the one roller rolls the bumper while forming nicks in the paint.

By the way, since heat is generated when a bumper is rolled, it might happen that the paint is heated by this heat to regain viscosity. It is accordingly desirable that the device comprises a cooling device for cooling the bumper prior to rolling of the bumper using the pair of rollers. It is accordingly possible to cure the paint such that nicks can be easily formed. Further, both end portions of a bumper are bent to match a shape of a vehicle so that it is difficult to make them being caught by the rollers. Further, since the bumper is made of synthetic resin material which exhibits elasticity and properties of returning to the original shape, both end portions will hardly become flat also upon rolling using the rollers, and it is difficult to make the shot blast hit in an uniform manner. It is accordingly desirable that the device comprises a cutting device for forming a plurality of slits in a longitudinal direction of the bumper on both end portions of the bumper prior to the rolling of the bumper using the pair of rollers. With this arrangement, both end portions of the bumper can be easily inserted to between the rollers and both end portions can be easier flattened after rolling using the rollers.

Even if shot blasting is performed using the above-mentioned shot blast device, it might happen that a part of the paint remains. For completely removing the paint, it will be necessary to either perform shot blasting for a long time or to strengthen the shot blast both of which will involve higher costs. It is accordingly desirable that the device comprises a brushing device for removing paint remaining on the bumper after performing shot blasting using the shot blast device. With this arrangement, it will be possible to achieve time saving needed for the shot blasting and simplification of the shot blast device.

The shot blast that has been jetted by the shot blast device will be scattered around together with the removed paint. It is accordingly desirable that the device comprises a catching device for catching the shot blast after removing the paint. In this case, the direction of the shot blast of the shot blast device is defined to be a direction that is diagonally orthogonal to the surface of the bumper with respect to the moving direction of the bumper. The catching device is arranged to comprise a sucking device that includes an aperture for catching shot blast that has rebound from the surface of the bumper and that sucks the shot blast caught by this aperture. With this arrangement, rebound shot blast can be effectively sucked to prevent scattering.

Here, "a pair of rollers" indicates an arrangement for pinching the bumper between the rollers for rolling, and it might either be of single stage or multiple stages. The "pair of rollers" includes also rollers that roll the bumper while forming "nicks" in the paint not only on the front surface of the bumper but also on a rear surface thereof.

The "shot blast device" is not limited to a device that jets shot blast onto the front surface of the bumper but also a device that removes paint upon jetting shot blast not only on the front surface but also on the rear surface. The direction of jetting shot blast is not limited to a direction that is orthogonal to the surface of the bumper but could also be a direction that is diagonally orthogonal to the surface of the bumper. There are no limitations for nozzle shapes for jetting the shot blast, and the jet might be conical or oblong shaped in a direction orthogonal to the longitudinal direction of the bumper, and the injection tip of the shot blast might also be variable. The number of nozzles is not limited to one but there might also be provided a plurality thereof on the front surface and the rear surface, and the plurality of nozzles could either be of single stage or multiple stages. In this respect, the raw material of the shot blast is not limited to sand blast or ceramic powder but could also be of glass, metal such as iron, silicon or dry ice, thermosetting resin such as melamine resin or urea resin and thermoplastic resin such as polyethylene, polystyrene or polypropylene.

The "grooves or projections provided on the surface of one roller" indicate concave and convex patterns formed on the surface of the roller which might, for instance, be linear grooves or projections, or circular, square or diamond shaped or the like projections formed on the peripheral surface of the roller at constant intervals in an axial direction or a diagonal direction with respect to this axial direction of the roller. The "nicks" indicate conditions in which cracks or scratches are formed in the paint caused through contact with the grooves or projections.

The "cooling device" is not limited to a device for cooling the paint on the bumper by jetting gas such as cold air or fluid such as water but also a freezing machine for cooling the bumper. The gas is not limited to air but also be carbon dioxide gas or nitrogen gas. The position which is "prior to rolling the bumper" for providing the "cooling device" is not limited to be a position immediately prior to the rollers but it could also be a position prior to the "cutting device" which will be discussed later.

The number of "the plurality of slits" is not limited to two but might also be three or more. The "cutting device" might be a roller cutter with a rotary knife that moves, for instance, up and down, to the right and left and to the front and back, a press machine having a cutting blade or a cutting guillotine. The position "prior to rolling the bumper" for providing the "cutting device" is not limited to be a position immediately prior to the rollers but it could also be a position prior to the above-mentioned "cooling device".

The "brushing device" might, for instance, be a device that scrubs not only the front surface but also the rear surface of the bumper by means of a cylindrical or disk-like brush. The brush is not limited to be one, made of metal wire such as steel wire but it might also be comprised of synthetic resin wire materials such as polyester or nylon or nylon wire material mixed with silicon sand.

While the "aperture for catching shot blast" is desirably orthogonal to the direction of the shot blast, it might also include cases in which the aperture intersects diagonally. The sectional shape of the "aperture" is not limited to be oblong but might also be polygonal includes a circular, elliptic or polygonal shapes such as triangular shapes. The "sucking device" is indicates all kinds of devices that suck the shot blast that has been caught by the "aperture" and that transfers the shot blast to a storage tank or a gravity separating device such as a cyclone or a winnowing machine.

As for the "direction diagonally intersecting the surface of the bumper", an angle formed with respect to the surface of the bumper is desirably 60 to 80 degrees and more desirably 70 to 80 degrees.

Effects of Invention

The device for removing paint from a bumper according to the present invention is capable of easily forming nicks over the entire surface of the paint by providing grooves or projections on the surface of a roller that contacts the surface of the paint. Since one roller has a rotational speed that is faster than that of the other roller, the grooves or projections of the roller that has entered the above nicks pushes the paint in the moving direction so as to easily peel off the paint or to lift end portions of the nicks. Further, since the bumper is rolled by the rollers, the nicks can be widened. With this arrangement, parted strip-like paint and a plurality of paint pieces will remain on the surface of the bumper that is transferred out from the rollers. When shot blast is accordingly jetted towards the strip-like paint or the like, the shot blast will hit against the end portions of the nicks and the lifted portions so that paint can be easily peeled off.

By providing a cooling device for cooling the bumper prior to rolling of the bumper, it is possible to cure the paint so that nicks can be easily formed and to restrict excess heating of the rolling rollers.

By providing a cutting device that forms a plurality of slits in a longitudinal direction of the bumper at both end portions of the bumper in the longitudinal direction prior to rolling of the bumper, the end portions of the bumper can be easier inserted between the rollers. Since the bumper can be transferred in a flat manner without returning to the original shape after rolling, the shot blast can uniformly hit the paint or the like and others so that the paint can be more effectively removed.

By providing a brushing device for removing paint that has remained on the bumper after shot blasting, it is possible to remove not only paint that could not be removed by the shot blast device but also the shot blast itself that has fixed to the bumper.

By providing a catching device for catching the rebounding shot blast by the aperture and that sucks the shot blast by means of a sucking device, it is possible to prevent the shot blast from scattering to the periphery. With this arrangement, it is possible to rapidly reuse the collected shot blast without waste.

REFERENCE SIGNS LIST

Figure 1:
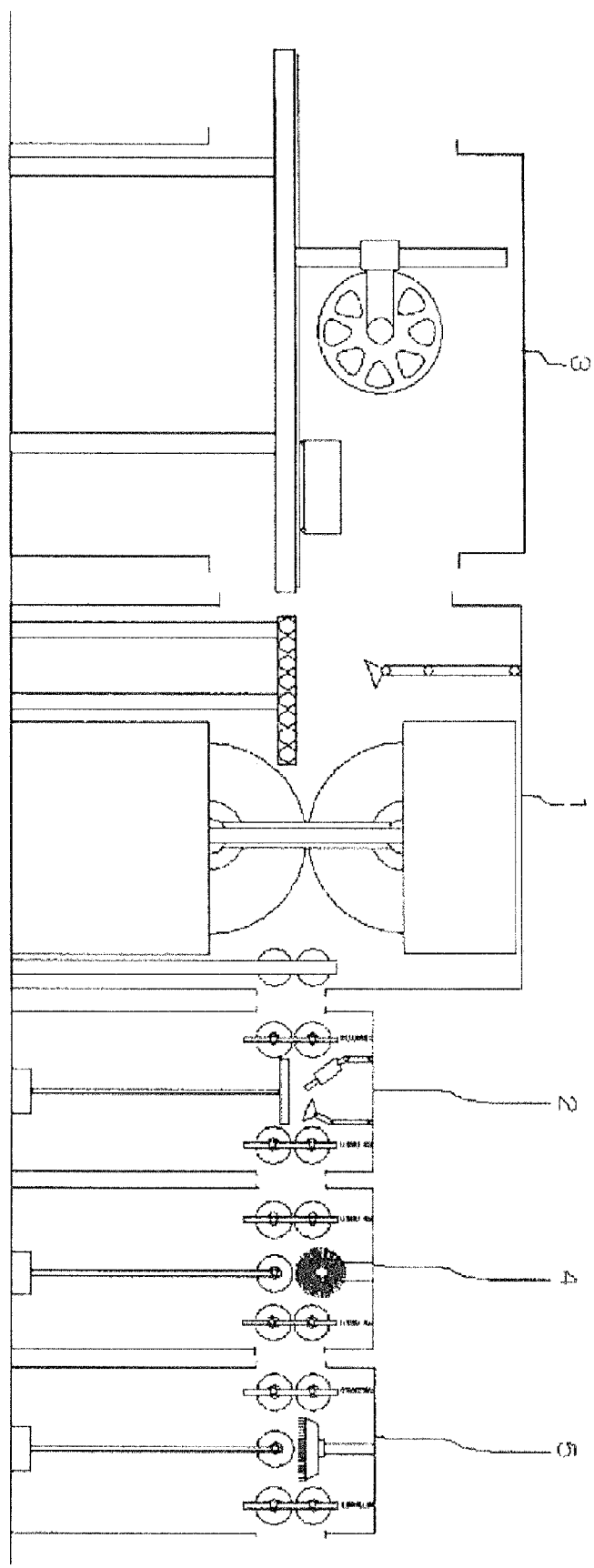
FIG. 1 is an overall view of the device for removing paint of a bumper.

1 Roller device
11 Paint side roller
11a Groove or projection
12 Resin side roller
13 Cooling device
2 Sand blast device
21, 121 Nozzle
22 Catching device
22a Aperture
22b Sucking device
3 Cutting device
4 Brushing device
5 Brushing device

DESCRIPTION OF EMBODIMENTS

The structure and actions of a device for removing paint from a bumper of a vehicle comprised of synthetic resin according to the present invention will now be explained while referring to FIG. 1 to FIG. 8. It should be noted that the device for removing paint from a bumper could be arranged in that it removes paint not only from a front surface of a bumper but also paint that has been applied to the rear surface simultaneously.

As shown in FIG. 1, the device for removing paint from a bumper comprises a roller device 1 having a pair of rollers for rolling the bumper and a sand blast device 2 for removing paint remaining on the surface of the bumper that has been transferred from the roller device. The device for removing paint from a bumper of a vehicle further comprises a cutting device 3 for forming two slits in a longitudinal direction of the bumper into both end portions of the bumper prior to rolling of the bumper by the roller device 1, and brushing devices 4 and 5 for removing paint remaining on the bumper after sand blasting by using the sand blast device.

Figure 2:
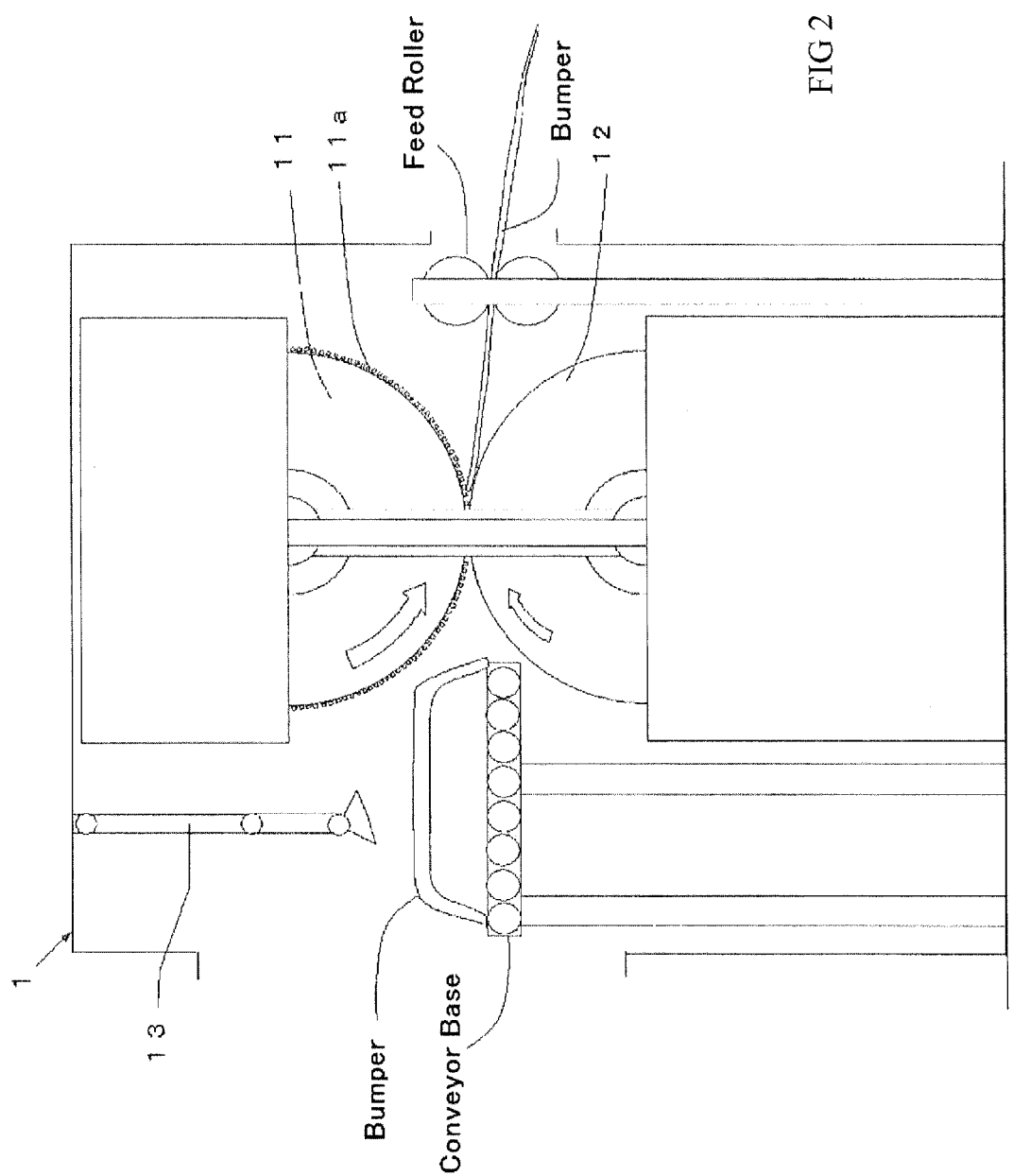
FIG. 2 is a side view of a rolling device.

FIG. 2 show an example of a structure of the roller device 1. The roller device comprises a pair of rollers wherein one roller that is located upward constitutes a paint side roller 11 that contacts the surface of the paint and the other roller that is located downward constitutes a resin side roller 12 that contacts the synthetic resin. The device for removing paint from a bumper of a vehicle comprises a cooling device 13 for cooling the bumper that is located proximate of a front side of the roller device 1. The paint side roller 11 and the resin side roller 12 rotate in mutually opposing directions, and the paint side roller has a rotating speed that is faster than that of the resin side roller.

It should be noted that there are respectively provided, for instance, a supply pipe and a discharge pipe for passing cooling water (not shown) at respective central axes of the paint side roller 11 and the resin side roller 12. There is provided a chiller for making cooling water flow through this supply pipe for cooling the paint side roller 11 and the resin side roller 12, for discharging the cooling water via the discharge pipe and for collecting heat from the discharged cooling water. With this arrangement, heating of the rollers is restricted so as to prevent heat from being transmitted to the bumper. The conveyer platform for transferring the bumper to the roller device 1 and the feed rollers or the like for transferring the bumper to the sand blast device 2 are not limited to those as shown in the drawings but it is possible to provide a necessary number suitable for operation. The roller device 1 is not limited to an arrangement in which the paint side roller 11 and the resin side roller 12 are disposed vertically so as to convey the bumper from lateral directions, but the rollers could be disposed laterally so as to convey the bumper from upward or downward or the rollers could be disposed diagonally so as to convey the bumper from an upper slant direction or a lower slant direction. There are no limitations for angles or the like of inserting the bumper.

Figure 3:
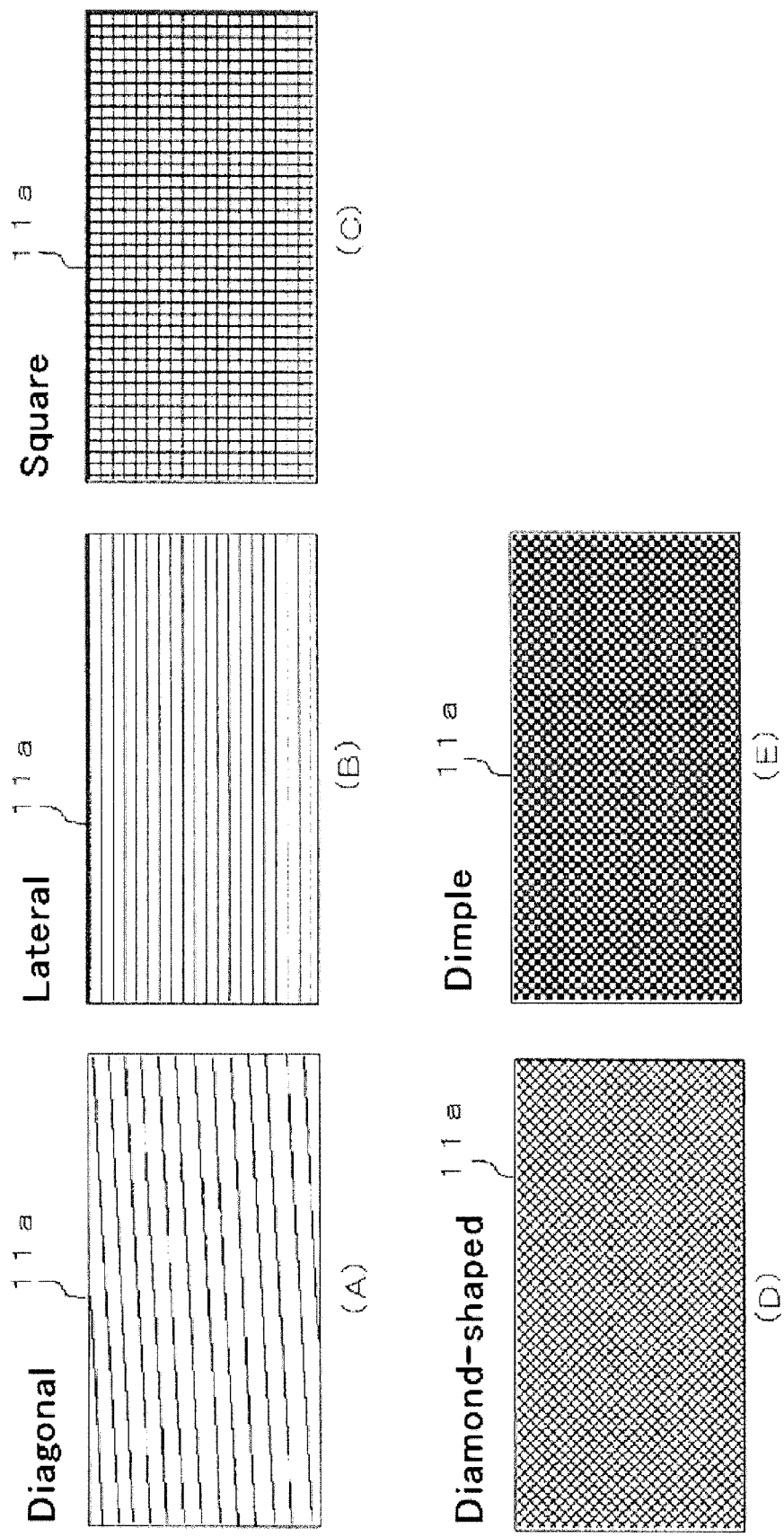
FIG. 3 are views of shapes of grooves or projections provided on the surface of a paint side roller.

Grooves or projections 11a are formed on the surface of the paint side roller 11, and the bumper is rolled while forming nicks in the paint through these grooves or projections. FIG. 3 shows concrete examples of patterns of the grooves or projections 11a. More particularly, FIG. 3(A) and FIG. 3(B) show cases of grooves or projections in form of oblique and vertical lines that are arranged at constant intervals over the peripheral surface, FIG. 3(C) and FIG. 3(D) cases of grooves or projections in form of squares and diamond shapes, and FIG. 3(E) a case of projections in form of dimples, respectively. It is also possible to provide the grooves or projections 11a not over the entire surface of the resin side roller 12 but to form the grooves or projections 11a only on a part of the surface, and it is further possible to divide the surface of the resin side roller into a plurality of regions and to provide different grooves or projections for each of the regions.

The cooling device 13 as shown in FIG. 2 jets ambient air that has been cooled to, for instance, approximately −25 to −15 degrees by means of a freezing machine (not shown) towards the surface of the bumper from a tip nozzle. In this respect, when the nozzle is provided at a position that is proximate to the bumper surface, it is possible to easily cool the entire surface.

Figure 4:
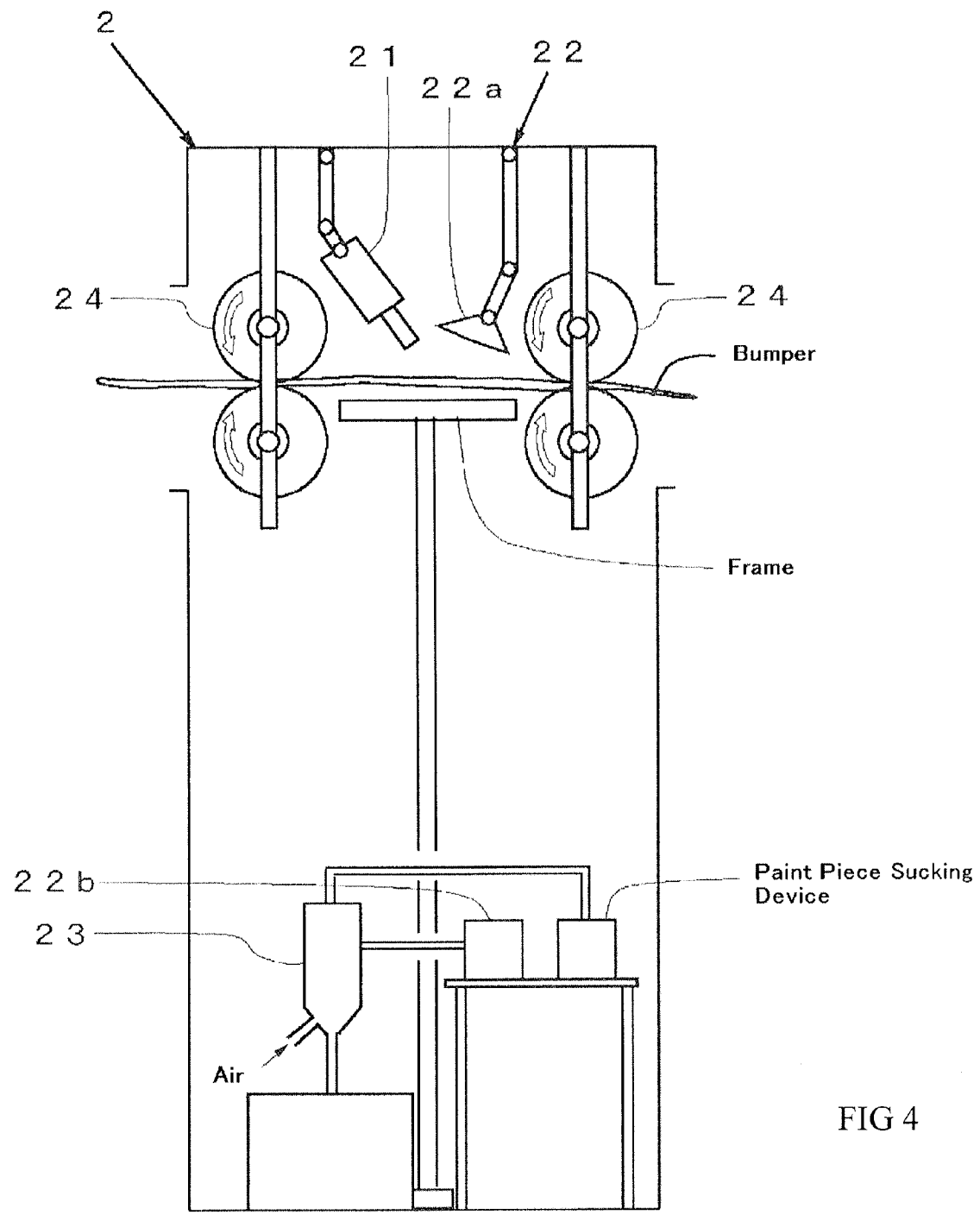
FIG. 4 is a side view of a sand blast device.

FIG. 4 shows one example of a sand blast device 2. The sandblast device comprises a nozzle 21 for jetting sandblast towards the bumper, a catching device 22 for catching sand blast that has rebound from the surface of the bumper, a cyclone 23 for separating the caught sandblast and the removed paint, and feed rollers 24, 24 for vertically pinching the bumper that has been transferred from the roller device 1 between and for transferring the bumper to the brushing device 4. The catching device 22 further comprises an aperture 22*a* for catching the rebound sand blast and a sucking device 22*b* for sucking the caught sand blast. The aperture 22*b* is further arranged to be substantially orthogonal to the direction of the sand blast that has rebound from the surface of the bumper.

In this respect, since the bumper is supported from its rear surface by means of a frame provided between the feed rollers 24, 24, it is possible to more effectively remove paint through the sand blast. Further, when the distance between the nozzle 21 and the catching device 22 is narrowed while simultaneously narrowing the distance between the feed rollers 24,24, it is possible to shorten the time during which one end portion of the bumper is floating in the air. In other words, it is possible to prevent cases in which the bumper cannot be transferred since it has been moved or oscillated through the power of the jetted sand blast.

In this respect, it is possible to provide the nozzle 21 and the aperture 22*a* not only on the front surface side of the bumper but also on the rear surface side so as to perform simultaneous sand blasting onto both surfaces. It is also possible to provide another sand blast device with a nozzle and aperture on the rear surface side of the bumper so as to sequentially perform sand blasting of the front surface and the rear surface of the bumper. The feed rollers 24, 24 are respectively driven to rotate in a direction that is identical to the feed direction of the bumper. From among the feed rollers 24, 24, the roller that is illustrated to be the upper one is desirably arranged to be coupled to an elastic member such as a spring to be vertically movable.

In this respect, the sand blast that has been sucked by the sucking device 22*b* and the paint pieces that have been intermingled into the sand blast are gravity separated through air current that has been sent from downward of the cyclone 23. After gravity separation, the sand blast is accumulated in a catcher tank (not shown) to be reused for sand blasting. The paint pieces after gravity separation are sucked and collected by a paint piece sucking device.

Figure 5:
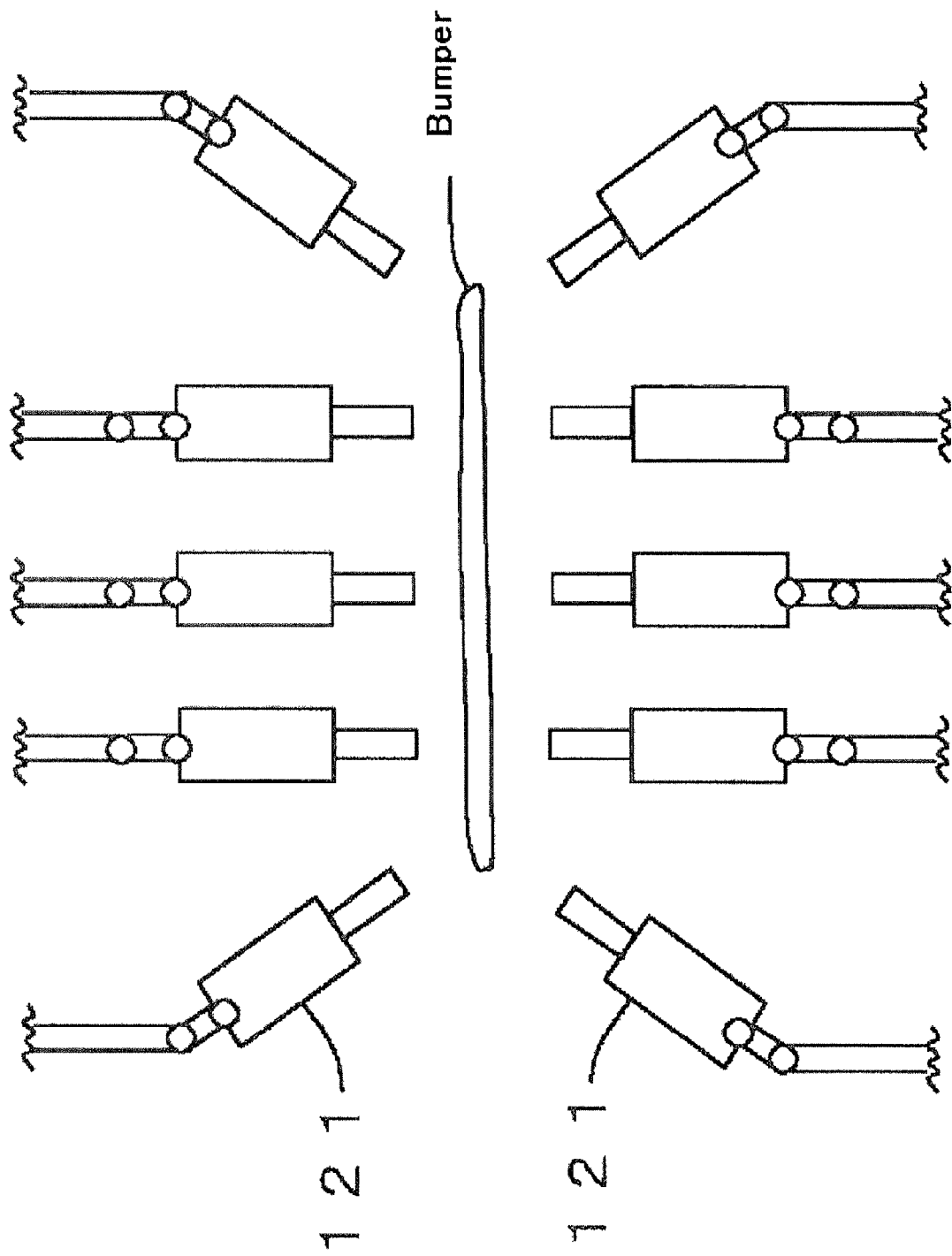
FIG. 5 is a partial front view of another sand blast device.

FIG. 5 shows a case in which the sand blast device as shown in FIG. 4 includes a plurality of nozzles on the front surface side and the rear surface side of the bumper, respectively. The bumper is transferred in a direction that is orthogonal to that of FIG. 5. From among the plurality of nozzles 121 that are respectively provided on the front surface side and the rear surface side, the nozzles located on both ends are provided to perform sand blasting from oblique directions with respect to the end portions of the bumper. With this arrangement, it is possible to effectively remove paint on the front surface of the bumper and that has scattered up to end portions on the rear surface of the bumper during a painting process of the bumper. In this respect, the plurality of nozzles 121 is not limited to an arrangement in which they are aligned in a row orthogonal to the feed direction of the bumper but could also be arranged diagonally.

Figure 6:
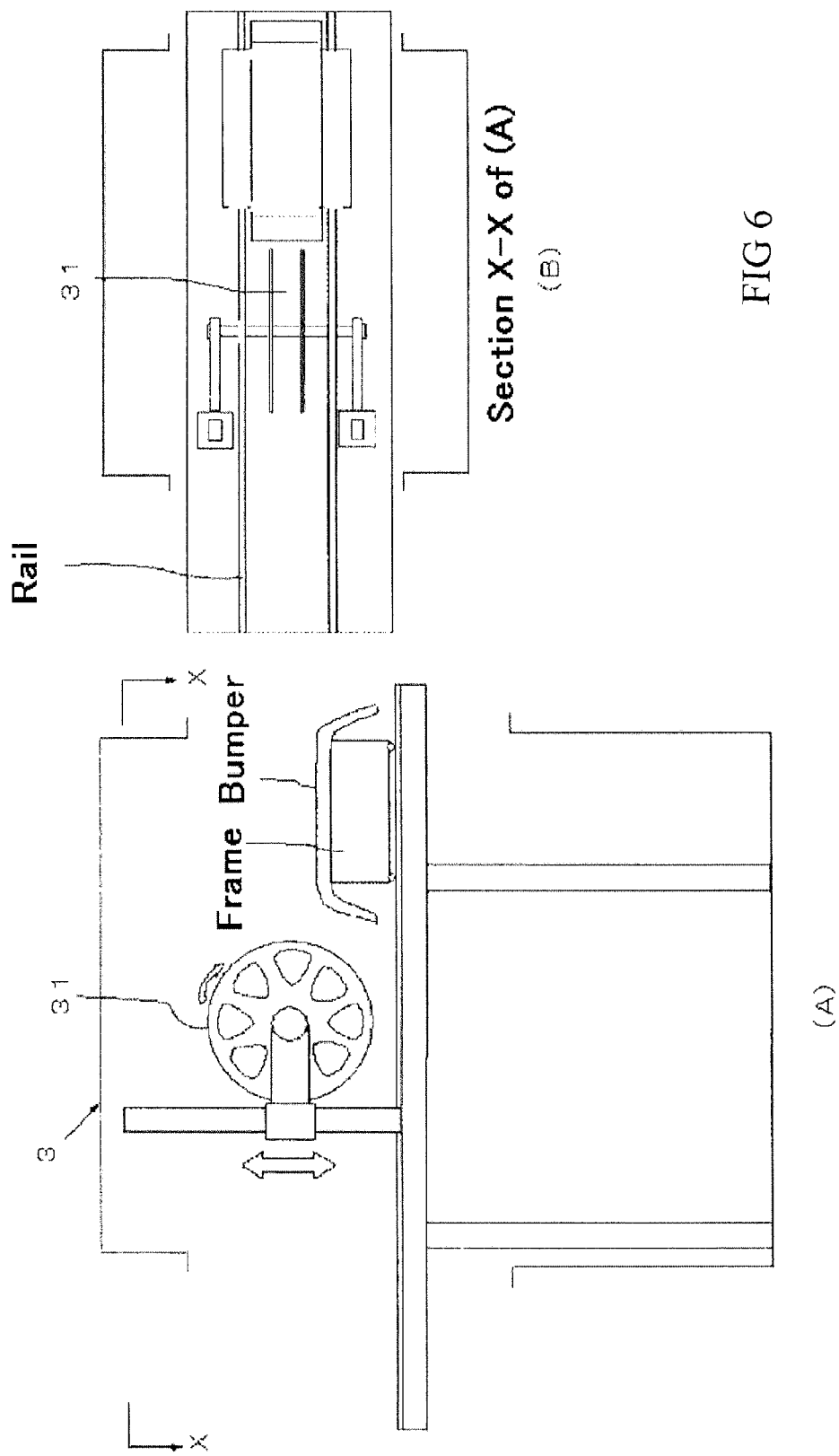
FIG. 6 is a side view and a top view of a cutting device.

FIG. 6 shows one example of a cutting device 3. The cutting device comprises a rotary knife 31 that is vertically movable. As shown in FIG. 6(B), with two mutually parallel rotating rotary knifes 31, it is possible to simultaneously form two slits in the longitudinal direction of the bumper on end portions of the bumper. In this respect, the invention is not limited to an arrangement as shown in FIG. 6(B) in which slits are sequentially formed on both ends of the bumper while transferring the bumper by means of a frame on rails. It is also possible to employ an arrangement in which the bumper is mounted onto a rotating frame wherein the frame is rotated so that slits are formed end by end. It is also possible not to form slits but to cut both ends of the bumper by the rotary knife 31. Since a central portion of the bumper which both ends have been cut and removed will be of flat shape, it can be easily inserted into the rolling device 1.

Figure 7:
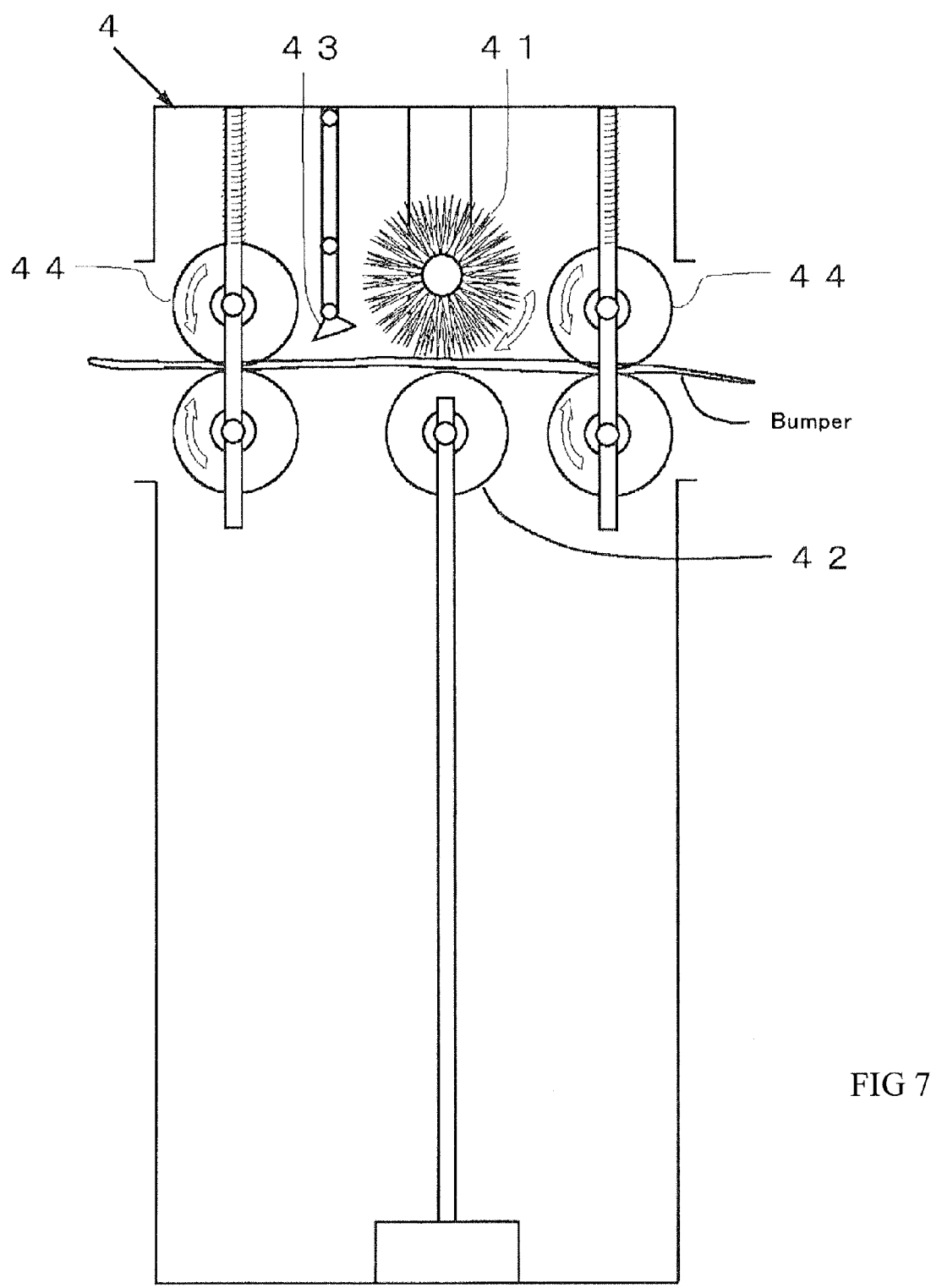
FIG. 7 is a side view of a brushing device.

FIG. 7 shows one example of an arrangement of the brushing device 4. The brushing device comprises a steel wire roll grinder 41, a rotator 42 for supporting the bumper from the rear surface such that paint can be easily removed by means of the steel wire roll grinder, a catching device 43 that is located proximate of the steel wire roll grinder and the surface of the bumper for catching the paint that has been removed by the steel wire roll grinder, and feed rollers 44, 44 located on both sides of the steel wire roll grinder for vertically pinching and feeding the bumper that has been transferred from the sand blast device 2.

The catching device 43 comprises an aperture for catching scattering paint that has been removed by the steel wire roll grinder 41 and a sucking device (not shown) for sucking the paint that has been caught by the aperture. The steel wire roll grinder 41 rotates in a direction opposite to the feed direction of the bumper. With this arrangement, remaining paint can be more effectively removed since the remaining paint collides with the tip end of the steel wire roll grinder at a speed which is a sum of a feed speed of the bumper and the rotational speed of the steel wire roll grinder 41. When a silica containing nylon wire brush is used, it is not only possible to effectively remove paint by the concaves and convexes of the silica but also to prevent wear of the nylon wire. It is possible to provide another steel wire roll grinder instead of the rotator 42. With this arrangement, it is possible to support the bumper from its rear surface while simultaneously removing the paint remaining on the rear surface. It is also possible to provide another brushing device with a steel wire roll grinder and others on the rear surface side of the bumper so as to sequentially brush the front surface and the rear surface of the bumper. It is also possible to employ a fixed frame instead of the rotator 42. In this respect, since the arrangement of the feed rollers 44, 44 is equal to that of the feed rollers 24, 24 as shown in FIG. 4, explanations thereof will be omitted.

Figure 8:
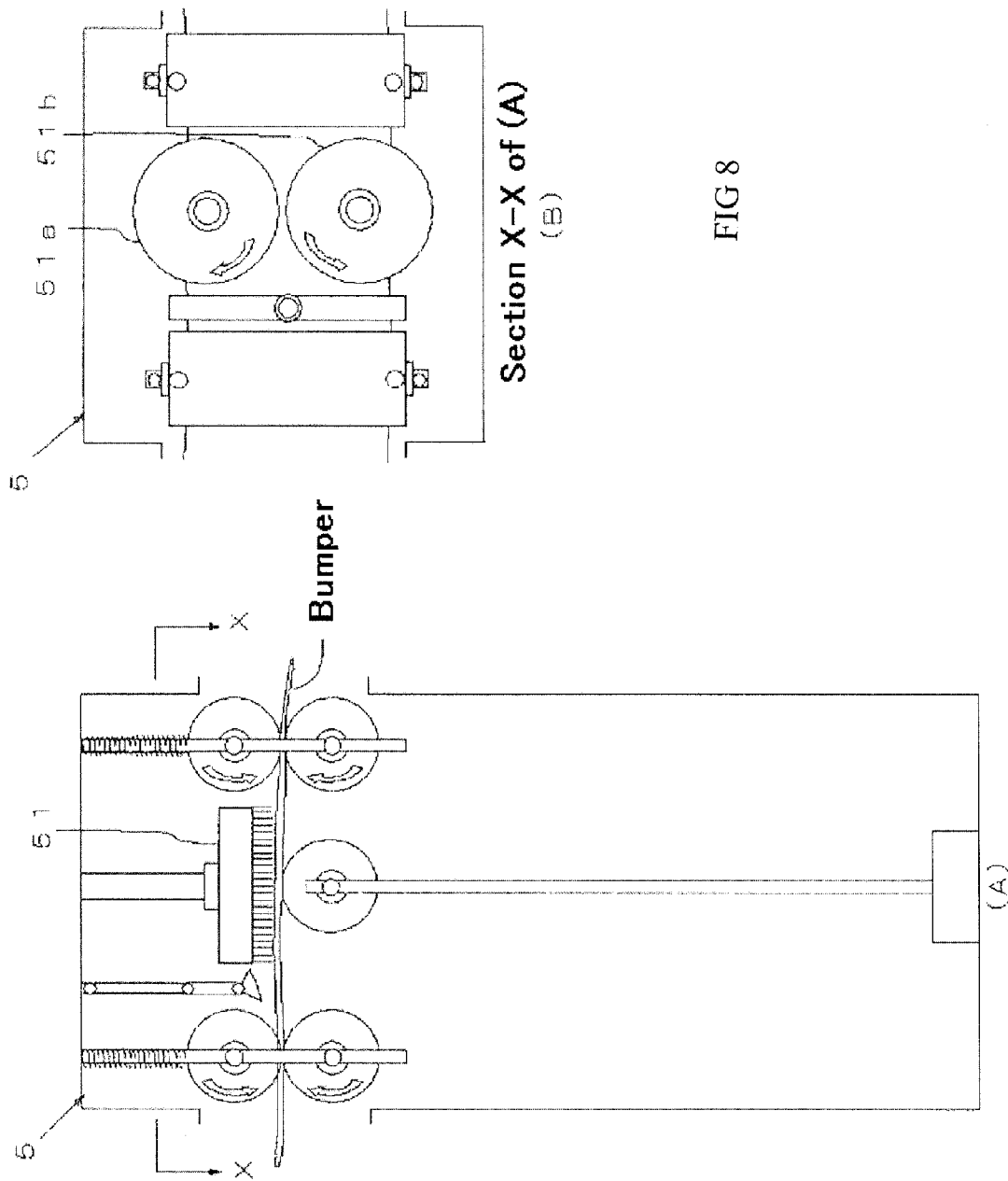
FIG. 8 is a side view and a top view of another brushing device.

FIG. 8 shows an arrangement in which another brushing device 5 is provided after the brushing device 4 as shown in FIG. 7. In this respect, only points that are different from those of the brushing device 4 as shown in FIG. 7 will be explained. The brushing device 5 comprises a disk-like brush 51. As further shown in FIG. 8(B), the disk-like brush 51 is comprised of two disk-like brushes 51*a* and 51*b* that are aligned in parallel wherein the overall lateral width thereof is set to be not less than the lateral width of the bumper. With this arrangement, it is possible to remove not only paint on the front surface of the bumper but also paint that has scattered up to end portions on the rear surface of the bumper in the course of painting the bumper. In this respect, it is possible to provide guide walls (not shown) on both sides in the front and rear of the disk-like brushes 51*a* and 51*b* so as to prevent deviation in the course of the bumper. It is possible to employ another disk-like brush that is aligned in parallel instead of the rotator that supports the bumper from the rear surface. With this arrangement, it is possible to remove paint remaining on the rear surface while simultaneously supporting the bumper from the rear surface. It is also possible to provide another brushing device with a disk-like brush on the rear surface side or the like of the bumper for sequentially brushing the front surface and the rear surface of the bumper. It is also possible to employ a fixed frame instead of the rotator.

Figure 9:
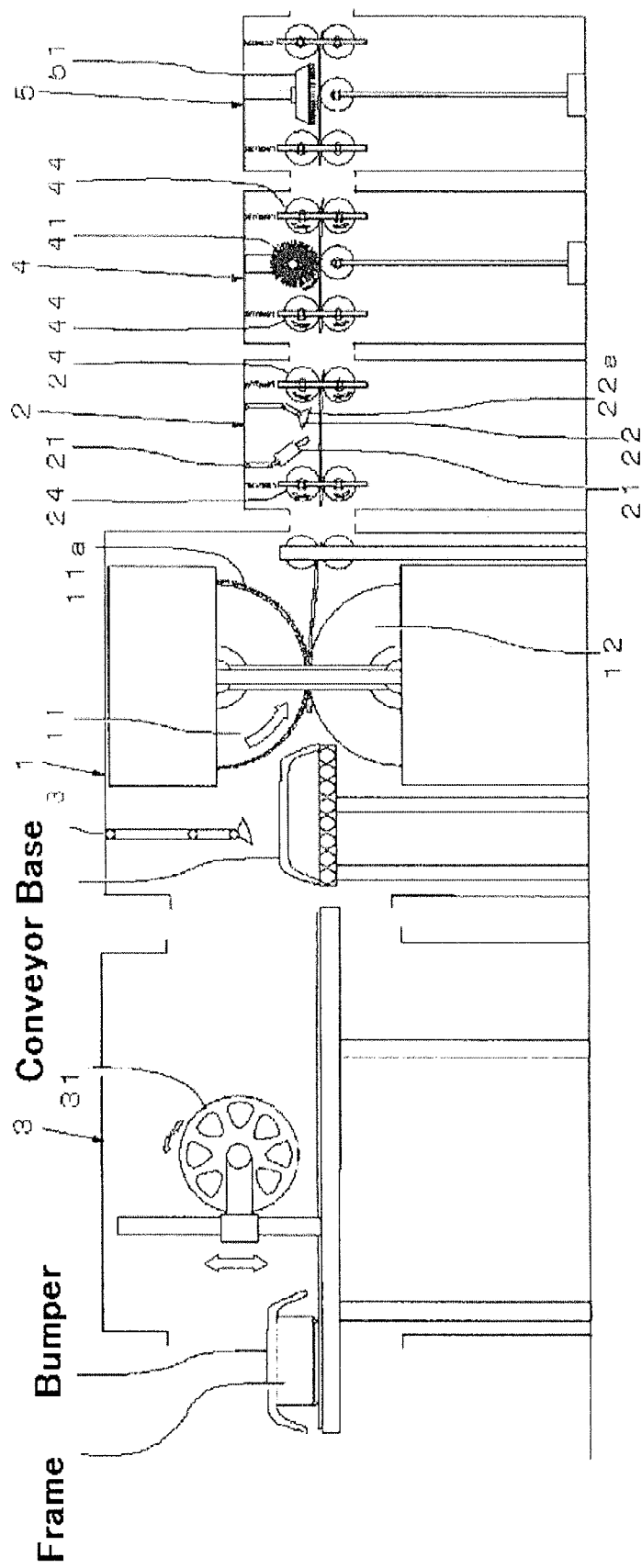
FIG. 9 is a view for explaining operations of the device for removing paint from a bumper.
Figure 10:
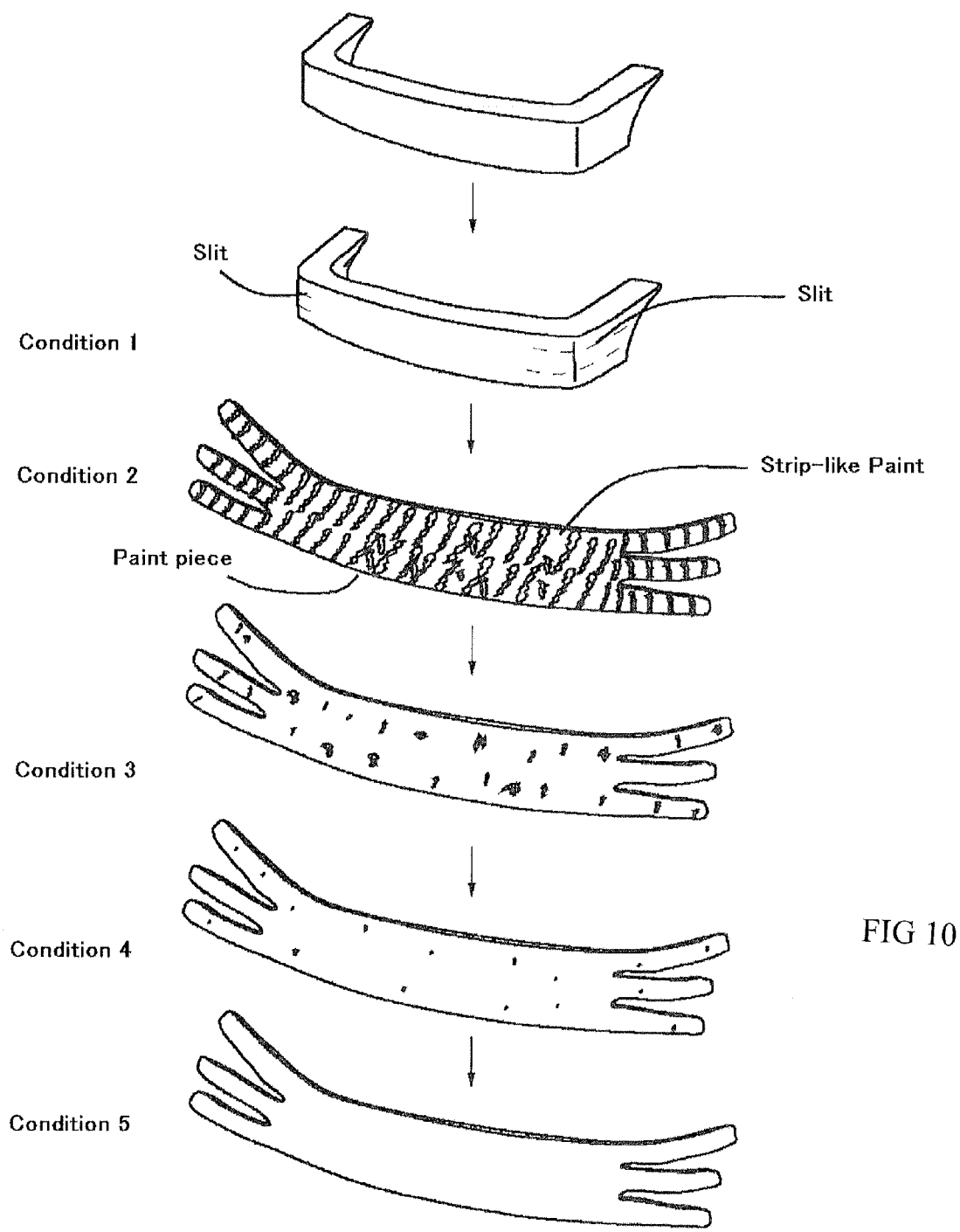
FIG. 10 is a view of a flow chart showing changes in shape and surface condition of a bumper.

Next, steps for removing paint from the surface of the bumper by the device for removing paint from a bumper according to the present invention and operations of the respective devices in each of the steps will be explained while referring to FIG. 9 to FIG. 12. Here, FIG. 9 shows steps in which the device for removing paint from the bumper transfers the bumper. FIG. 10 shows changes in the shape of the bumper and the paint on the surface thereof in each of the steps as conditions 1 to 5.

As shown in FIG. 9, the bumper is mounted onto the frame in the cutting device 3 and the frame moves along the rails towards the rotary knife 31 with the bumper being mounted thereon. When an end portion of the bumper on the moving direction side reaches a specified position, the frame stops and the rotary knife 31 comes down rotating. With this arrangement, two slits are formed in the longitudinal direction of the bumper at this end portion.

After forming the slit, the rotary knife 31 moves upward and the frame repeatedly moves forward. When an end portion of the bumper on a side opposite to the moving direction reaches a specified position, the frame stops and the rotary knife 31 comes down rotating. With this arrangement, two slits are formed in the longitudinal direction of the bumper also at this end portion. Accordingly, two slits are formed in the longitudinal direction at both end portions of the bumper as shown as condition 1 in FIG. 10. In this respect, operations of the frame or rotary knife 31 are not limited to manual operations but they might also be automatically controlled by providing a sensor or similar for detecting presence of a bumper.

The bumper in condition 1 is mounted on a conveyor base of the roller device 1. The cooling device 3 jets cold air towards the surface of the bumper mounted on the conveyor base by means of a nozzle. With this arrangement, transmission of heat that has been generated through rolling to the paint is delayed, and it is possible to roll the bumper while the paint maintains its cured condition. In this respect, operations of the cooling device 13 are not limited to manual operations but they might also be automatically controlled by providing a sensor or similar for detecting presence of a bumper.

The bumper is transferred to between the paint side roller 11 and the resin side roller 12 starting from its end portion on the moving direction side. Since the two slits formed in the longitudinal direction at both end portions of the bumper are expanded while being rolled, the bumper can assume a flat shape. It is possible to perform rolling while forming nicks in the paint on the surface of the bumper by means of the grooves or projections 11a provided on the surface of the paint side roller 11.

Figure 11:
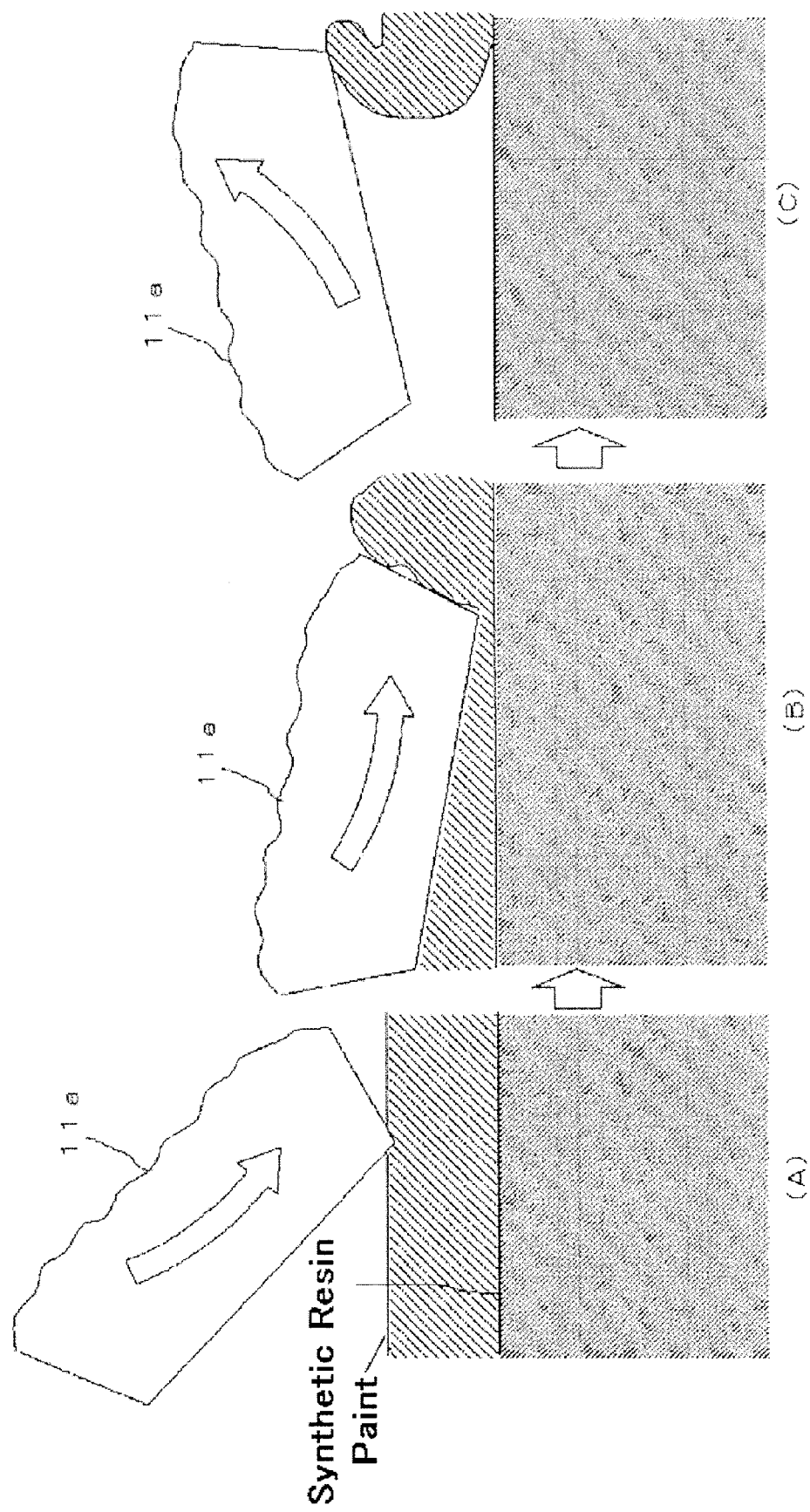
FIG. 11 is a view for explaining operations of a rolling device.

FIG. 11 sequentially shows conditions in which nicks are formed in the paint on the surface of the bumper. As first shown in FIG. 11(A), nicks are formed in the surface of the paint when a part of the grooves or projections 11a abuts the paint. Next, as shown in FIG. 11(B), the grooves or projections 11a scratch the paint when the paint side roller 11 rotates. Thereafter, as shown in FIG. 11(C), since the grooves or projections 11a are repeatedly moved upward accompanying rotation of the paint side roller 11, paint that has accumulated at ends are pulled up so that the paint is lifted from the synthetic resin.

Synchronous with the above-mentioned actions of forming nicks, the synthetic resin of the bumper is exposed to shear stress by the paint side roller 11 and the resin side roller 12 and is stretched. It is accordingly possible to further expand the nicks that have been formed in the cured paint. Accordingly, as shown in condition 2 of FIG. 10, the bumper that has been transferred by the roller device 1 is thinned to 1.5 mm to 2 mm from an original thickness of 2.5 mm to 3 mm. Parted strip-like paint and a plurality of paint pieces remain on the surface of the bumper.

The bumper in condition 2 is transferred to the feed roller 24 on the inlet side of the sand blast device 2, and the feed roller transfers the bumper to the feed roller 24 on the outlet side. Sand blast is jetted through the nozzle 21 in a direction that is diagonally orthogonal to the surface of the bumper from a direction that is identical to the feed direction of the bumper while the bumper is transferred by the feed rollers 24, 24. The timing of jetting the sand blast is not necessarily controlled manually but might also be automatically controlled by providing a sensor or similar for detecting that the bumper is transferred by the feed rollers 24, 24.

Figure 12:
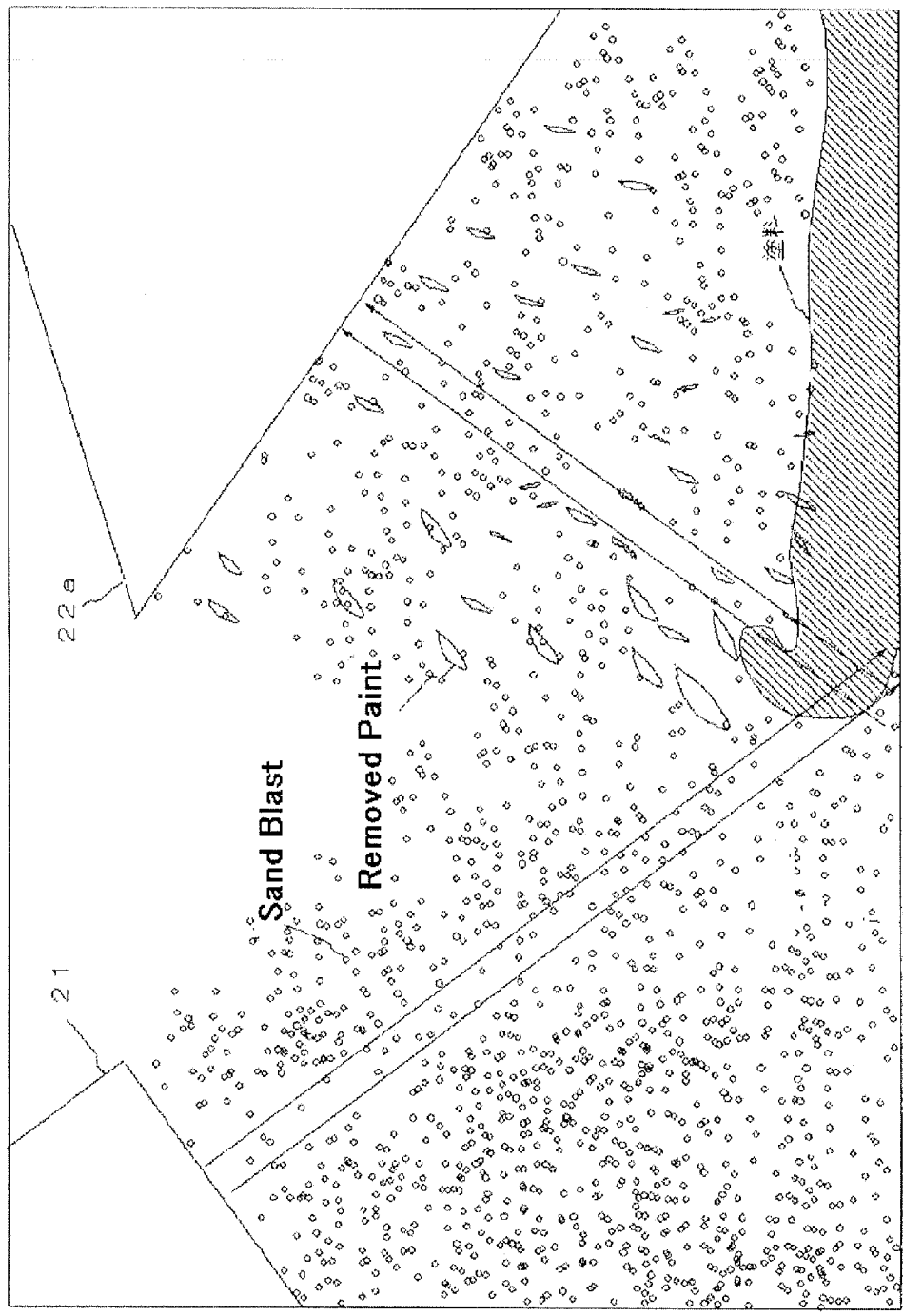
FIG. 12 is a view showing jetting of shot blast.

FIG. 12 shows a condition in which the jetted sand blast is rebound by the surface of the bumper and in which it is sucked together with the removed and scattering paint. The sand blast that has been jetted from the nozzle 21 does not only hit the surface of the paint but also lifted end portions of the paint as shown in FIG. 11(C). With this arrangement, it is possible to easily remove paint since not only pressure is applied to the paint from end portions but also the sand blast enters into clearances between the paint and the synthetic resin. On the other hand, the sand blast that has rebound from the surface of the bumper is sucked together with the removed paint by the aperture 22a of the catching device provided in a direction that is substantially orthogonal to the direction of the rebound sand blast. With this arrangement, it is possible to prevent scattering of the sand blast and the removed paint to the periphery and also to save the labor of collecting the sand blast. Accordingly, the surface of bumper that has been transferred out from the brushing device 2 will be in a condition in which the paint has been practically removed as shown as condition 3 to an extent in which only some paint that have been scrapped without being removed remains.

The bumper in condition 3 as shown in FIG. 10 is transferred to the feed roller 44 on the inlet side of the brushing device 4 and is transferred to the feed roller 44 on the outlet side by this feed roller. The steel wire roll grinder 41 rotates in a direction opposite to the feed direction of the bumper for scratching the surface of the bumper while the bumper is being transferred by the feed rollers 44, 44. Since the tip end of the steel wire roll grinder 41 and the paint remaining on the surface of the bumper collide, it is possible to more effectively remove the remaining paint. Accordingly, as shown as condition 4, the surface of the bumper that has been transferred from the brushing device 4 will be in a condition in which the paint has been almost completely removed.

The bumper in condition 4 as shown in FIG. 10 is transferred to the brushing device 5. The disk-like brush 51 rotates in a direction opposite to the feed direction of the bumper while the bumper is transferred and scratches end portions of the front surface and the rear surface of the bumper. Accordingly, the disk-like brush 51 can effectively remove not only a minute amount of paint that has very slightly remained on the surface of the bumper but also paint that has remained at end portions on the rear surface of the bumper. Accordingly, as shown as condition 5, the end portions on the front surface and the rear surface (not shown) of the bumper that has been transferred from the brushing device 5 will be in a condition in which the paint has been completely removed.

Since the bumper in condition 5 as shown in FIG. 10 is in a condition ready for reuse upon performing recycling processes, it is pelletized using respective devices.

For instance, the above bumper is roughly ground by using a primary grinder and is more finely ground in a secondary grinder while washing with water or the like. The material in the ground condition is dehydrated using a high-speed centrifugal extractor and is further exposed to gravity separation by means of a wash-type gravity separating device. It repeatedly undergoes centrifugal extraction whereupon the raw material is stored in a dry mixing tank for achieving homogenization of the raw material.

The raw material is moved from the dry mixing tank to a catcher tank and is filled into a flexible container bag via the catcher tank. Thereafter, resin obtained by heat melting the raw material in the flexible container bag by means of a screw-type single screw extruder is extruded from a die to form pellets which are cut by means of a hot cutter or the like. The cut pellets are transferred to a cooling water tank for cooling, and homogenization of the pellets is achieved by screening using a vibrator. The homogenized pellets are repeatedly moved to the catcher tank by means of a gas compressor, weighted and are packed.

INDUSTRIAL APPLICABILITY

Since the device for removing paint of a bumper according to the present invention performs effective removing processes upon parting the paint by forming nicks through grooves or projections so that it is widely applicable to industries related to automobiles.

The invention claimed is:

1. A device for removing paint from a bumper of a vehicle made of synthetic resin, the device for removing paint from a bumper of a vehicle comprising a pair of rollers for rolling the bumper, a cooling device for cooling the bumper prior to rolling the bumper by means of the pair of rollers, and a shot blast device for removing paint remaining on the surface of the bumper that is transferred out from the rollers,
    wherein the pair of rollers rotate in mutually opposing directions and one roller has higher rotating speed that is faster than that of the other roller,
    wherein grooves or projections are provided on the surface of the one roller, and
    wherein the pair of rollers rolls the bumper while forming nicks in the paint through the grooves or projections provided on the surface of the one roller.

2. The device for removing paint from a bumper of a vehicle as claimed in claim 1, comprising a cutting device for forming a plurality of slits in a longitudinal direction of the bumper at both end portions of the bumper in the longitudinal direction prior to roiling of the bumper by means of the pair of rollers.

3. The device for removing paint from a bumper of a vehicle as claimed in claim 1, comprising a brushing device for removing the paint remaining on the bumper that has underwent shot blasting by means of the shot blast device.

4. The device for removing paint from a bumper of a vehicle as claimed in claim 1, comprising a catching device for catching shot blast that is reflected from a surface of the bumper,
    wherein a direction of shot blast of the shot blast device is a direction that is diagonally orthogonal to the surface of the bumper with respect to a moving direction of the bumper, and
    wherein the catching device comprises an aperture for catching shot blast rebound from the surface of the bumper and a sucking device that sucks the shot blast caught by the aperture.

5. The device for removing paint from a bumper of a vehicle as claimed in claim 2, comprising a brushing device for removing the paint remaining on the bumper that has underwent shot blasting by means of the shot blast device.

6. The device for removing paint from a bumper of a vehicle as claimed in claim 2, comprising a catching device for catching shot blast that is reflected from a surface of the bumper,
    wherein a direction of shot blast of the shot blast device is a direction that is diagonally orthogonal to the surface of the bumper with respect to a moving direction of the bumper, and
    wherein the catching device comprises an aperture for catching shot blast rebound from the surface of the bumper and a sucking device that sucks the shot blast caught by the aperture.

7. The device for removing paint from a bumper of a vehicle as claimed in claim 3, comprising a catching device for catching shot blast that is reflected from a surface of the bumper,
    wherein a direction of shot blast of the shot blast device is a direction that is diagonally orthogonal to the surface of the bumper with respect to a moving direction of the bumper, and
    wherein the catching device comprises an aperture for catching shot blast rebound from the surface of the bumper and a sucking device that sucks the shot blast caught by the aperture.

8. The device for removing paint from a bumper of a vehicle as claimed in claim 5, comprising a catching device for catching shot blast that is reflected from a surface of the bumper,
    wherein a direction of shot blast of the shot blast device is a direction that is diagonally orthogonal to the surface of the bumper with respect to a moving direction of the bumper, and
    wherein the catching device comprises an aperture for catching shot blast rebound from the surface of the bumper and a sucking device that sucks the shot blast caught by the aperture.

* * * * *

UNITED STATES PATENT AND TRADEMARK OFFICE
CERTIFICATE OF CORRECTION

PATENT NO.        : 8,840,445 B2
APPLICATION NO.   : 13/638383
DATED             : September 23, 2014
INVENTOR(S)       : Noboru Takahashi It is certified that error appears in the above-identified patent and that said Letters Patent is hereby corrected as shown below:

On the Title Page Item (73) Assignee reads:

(73) Assignee: Takaroku Shoji., Ltd., Tokyo (JP)

should read:

(73) Assignee: Takaroku Shoji Co., Ltd., Tokyo (JP)

Signed and Sealed this
Third Day of February, 2015

Michelle K. Lee
*Deputy Director of the United States Patent and Trademark Office*